(No Model.)

G. K. RUDERT.
CHAIN GATE.

No. 484,572. Patented Oct. 18, 1892.

Witnesses:
H. J. Lewis
H. E. Harrison

Inventor:
George K. Rudert
Per O. D. Lewis
Att'y.

UNITED STATES PATENT OFFICE.

GEORGE K. RUDERT, OF PITTSBURG, PENNSYLVANIA.

CHAIN GATE.

SPECIFICATION forming part of Letters Patent No. 484,572, dated October 18, 1892.

Application filed December 10, 1891. Serial No. 414,641. (No model.)

*To all whom it may concern:*

Be it known that I, GEORGE K. RUDERT, a citizen of the United States, residing at Pittsburg, in the county of Allegheny and State of Pennsylvania, have invented certain new and useful Improvements in Chain Gates; and I do hereby declare the following to be a full, clear, and exact description of the invention, such as will enable others skilled in the art to which it pertains to make and use the same, reference being had to the accompanying drawings, which form a part of this specification.

My invention relates to an improved chain gate; and it consists in certain details of construction and combination of parts, as will be fully described hereinafter.

Figure 1:
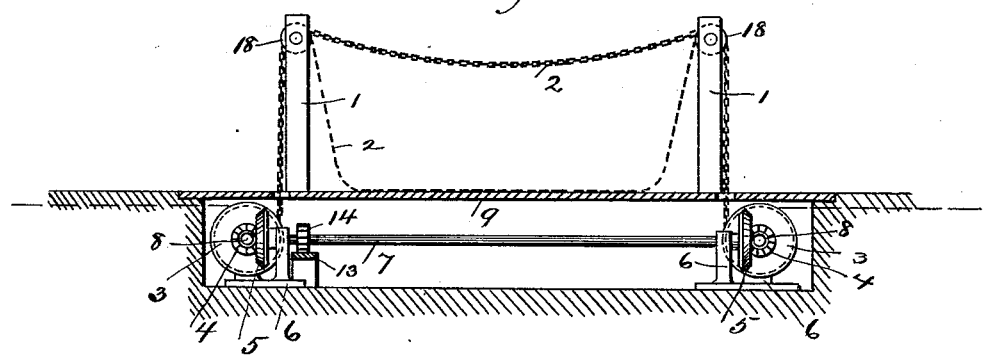
Figure 2:
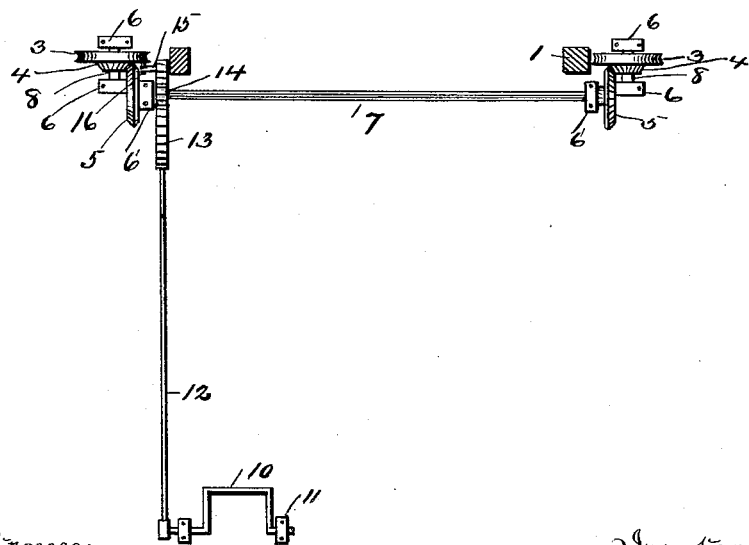

In the accompanying drawings, Figure 1 is a front sectional elevation of an improved gate, which is constructed in accordance with my invention. Fig. 2 is a sectional plan view of the same, taken on the line X X.

To construct a gate in accordance with my invention, I provide two posts 1 and erect the same in a vertical position, the one opposite the other. Arranged at the top of these posts 1 are sheaves 18, which support a chain 2, used for the purpose of closing the gate. Beneath the surface of the ground and arranged in suitable bearings 6 are two large grooved wheels 3, to which the chain 2 is attached and partly wound about the same. Attached to or integral with these two wheels 3 are small beveled pinions 8 in mesh with two others 5 of a greater diameter, which are attached to either end of a horizontally-arranged shaft 7. This shaft 7 is mounted in suitable bearings 6' and is provided with a small spur-wheel 14, which is in mesh with a horizontal rack-bar 13. This rack-bar 13 is connected by a rod 12 to a crank 10, placed in the roadway at a suitable distance from the gate.

In operation a carriage or wagon passing over the crank 10 will press the same down, thereby drawing the rod 12 and rack-bar 13 forward, which rotates the pinion 14. This movement of the pinion 14 is transmitted to the shaft 7, which in its turn revolves the two sets of bevel-gearing 5 and 4 and also rotates the large grooved wheels 3. This movement of the wheels 3 will lower the chain 2 to the ground or to the position shown by dotted lines on the drawings.

To lock the chain in the position shown in Fig. 1, I form a small projection 16 on one of the large grooved wheels 3, which is adapted to come in contact with a projecting portion 15, formed on the rack-bar 13. These two pieces 15 and 16 will when in contact lock the wheels 3 and prevent the same from lowering the chain 2.

Having thus described my invention, what I claim, and desire to secure by Letters Patent, is—

The herein-described chain gate, consisting of the two posts 1, the chain 2, suspended in sheaves across the same, the large grooved wheels 3, arranged beneath the surface of the ground and geared by means of beveled pinions to a shaft 7, a small spur-wheel 14, attached to the said shaft and in mesh with a sliding rack-bar 13, a crank 10, arranged in bearings above the ground and connected to the rack-bar 13 by a rod 12, and a device whereby the chain-wheels may be locked, all arranged and combined for service substantially as and for the purpose described.

In testimony that I claim the foregoing I hereunto affix my signature this 24th day of November, A. D. 1891.

GEORGE K. RUDERT. [L. S.]

In presence of—
JOHN W. MOORE,
T. F. EWING.